United States Patent [19]

Ripley et al.

[11] Patent Number: 5,050,628

[45] Date of Patent: Sep. 24, 1991

[54] TANK ENTRY PROCEDURE AND APPARATUS

[75] Inventors: Ian Ripley; Anthony H. Needham, both of Cleveland, Great Britain

[73] Assignee: Great Eastern (Bermuda) Ltd.

[21] Appl. No.: 464,859

[22] Filed: Jan. 16, 1990

[30] Foreign Application Priority Data

Feb. 1, 1989 [GB] United Kingdom ................ 8902117

[51] Int. Cl.[5] ........................ F16K 43/00; F16L 55/10

[52] U.S. Cl. ...................................... 137/15; 137/315; 138/94.3; 220/465

[58] Field of Search ..................... 137/15, 315, 561 R, 137/565; 138/94, 94.3; 220/465, 565

[56] References Cited

U.S. PATENT DOCUMENTS

| | | | |
|---|---|---|---|
| 2,386,893 | 10/1945 | Hamer | 138/94.3 |
| 2,786,644 | 3/1957 | Koppl | 138/94.3 |
| 2,889,853 | 6/1959 | Dryer | 138/94.3 |
| 3,099,292 | 7/1963 | Ausburn | 138/94.3 |
| 3,165,124 | 1/1965 | Ausburn et al. | 138/94.3 |
| 3,319,661 | 3/1967 | Shindler | 138/94.3 |
| 3,415,285 | 12/1968 | Torp | 138/94.3 |
| 3,474,818 | 10/1969 | Hartman | 137/315 |
| 4,640,302 | 2/1987 | Impey | 137/315 |

*Primary Examiner*—George L. Walton

*Attorney, Agent, or Firm*—George A. Skoler

[57] ABSTRACT

A tank accessing procedure is disclosed which allows for the replacement of a cover plate from a tank manway with an adapter having the capability of permitting access to the interior of the enclosure, without any appreciable spillage of the contents of the tank, even if the level of such tank contents is above the height of the manway. In particular, the method comprises first inserting a blanking plate between the cover plate and the manway flange, which blanking plate is then secured to the manway flange. The cover plate is then removed leaving the blanking plate as the sole means of retaining the tank contents in place. The adapter is then secured to the manway flange and the blanking plate is removed thereby completing the accessing operation.

13 Claims, 16 Drawing Sheets

FIG. 1
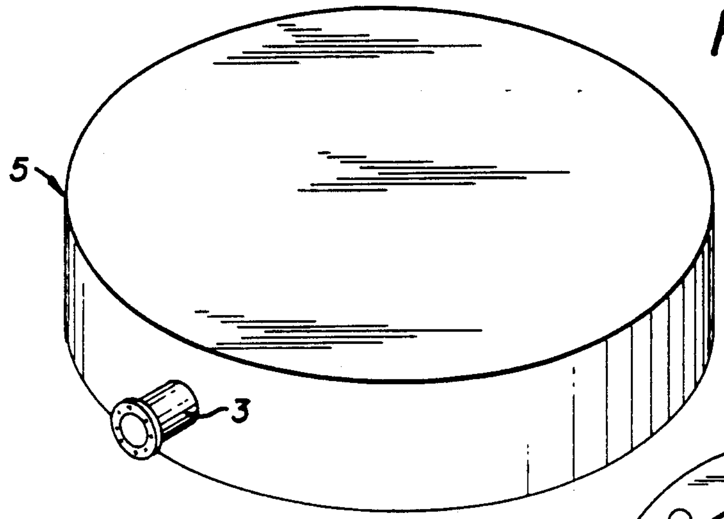
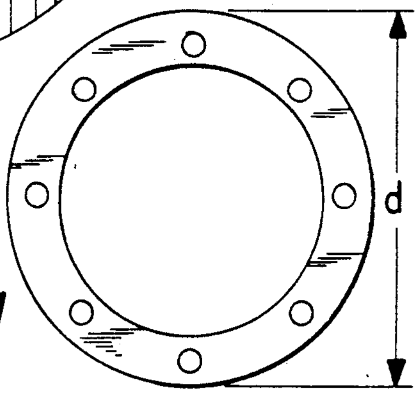
FIG. 19a
FIG. 19b
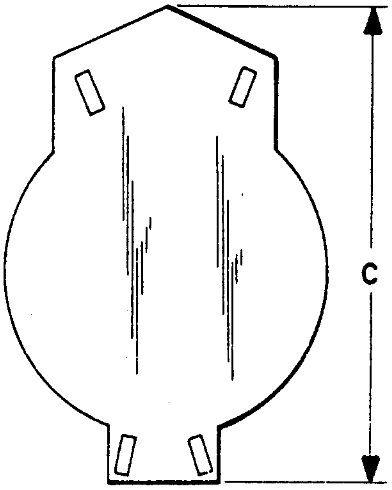
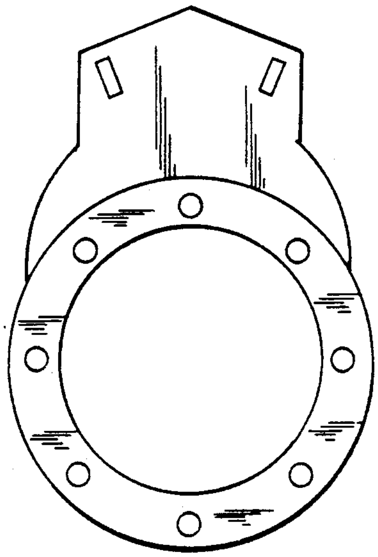
FIG. 19c

FIG. 4C
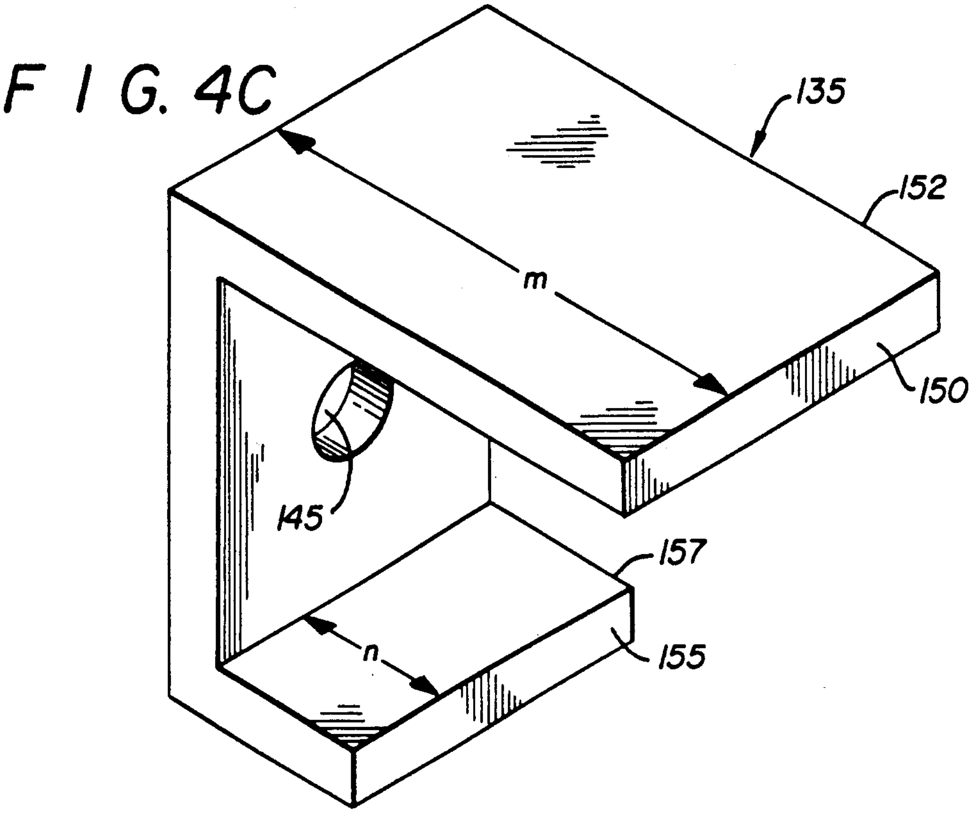
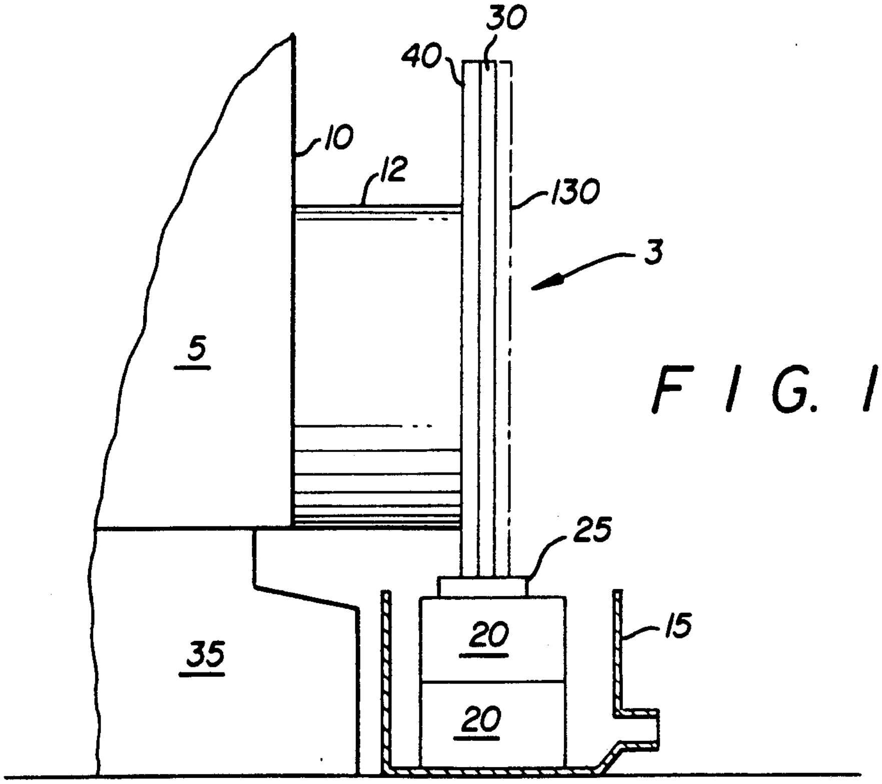
FIG. 11

FIG. 7a
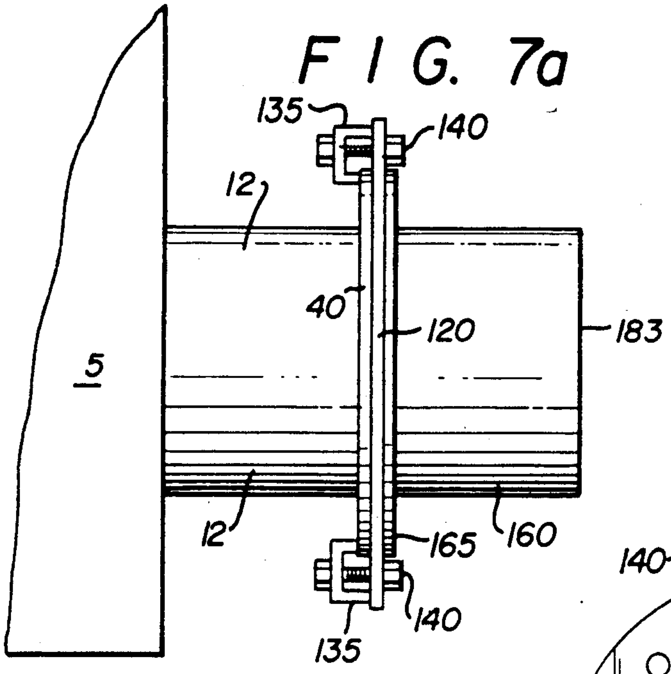
FIG. 7b
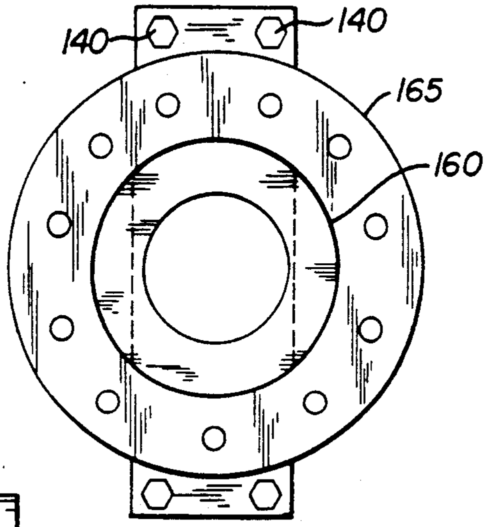
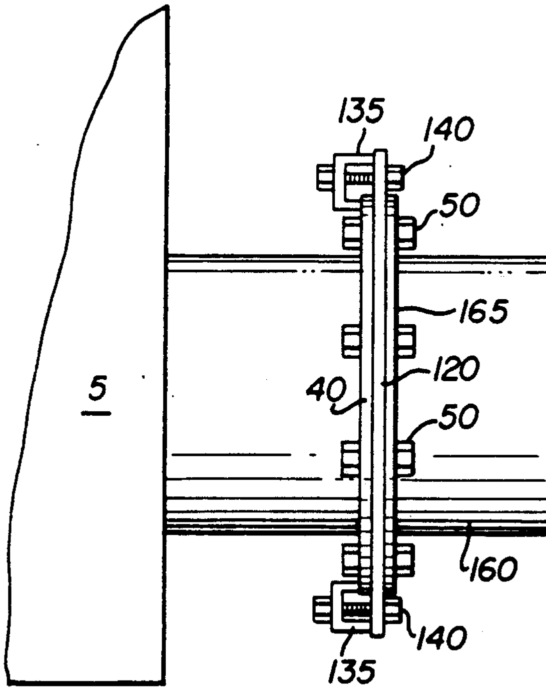
FIG. 8a
FIG. 8b
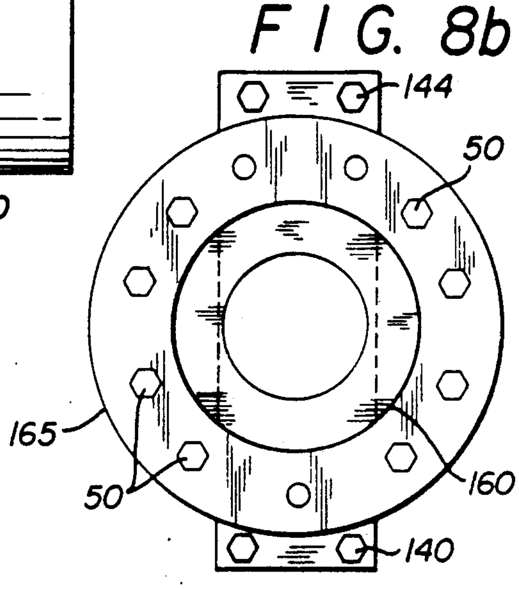

FIG. 9
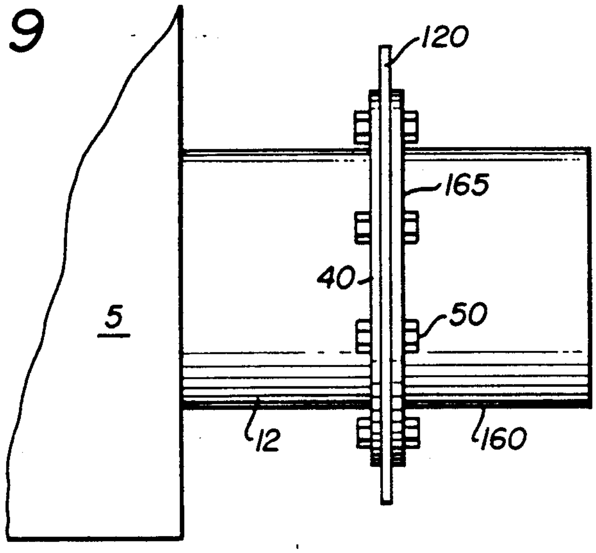
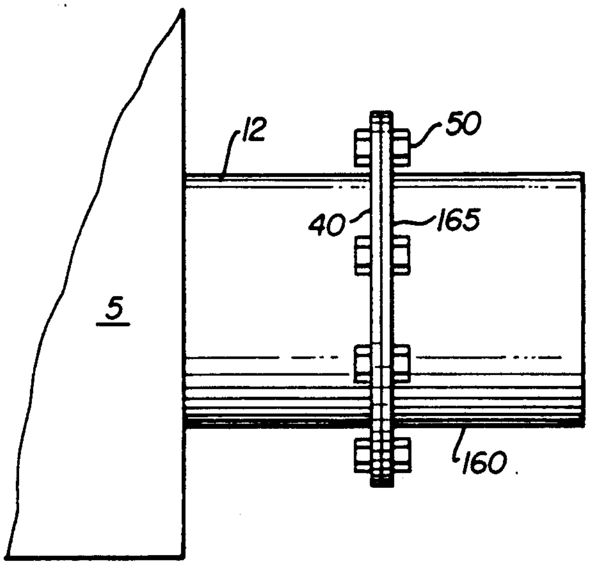
FIG. 10

FIG. 15c
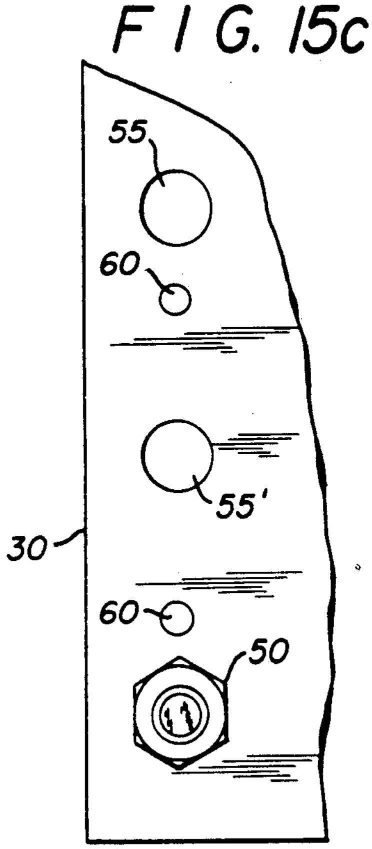
FIG. 15d
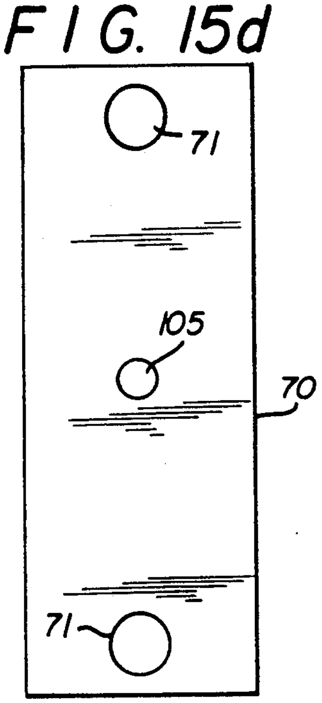
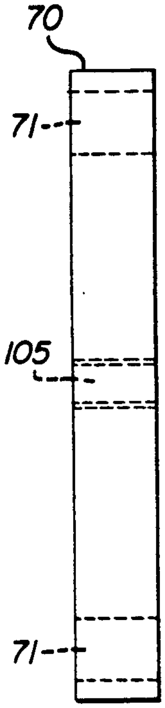
FIG. 15d'
FIG. 15e'
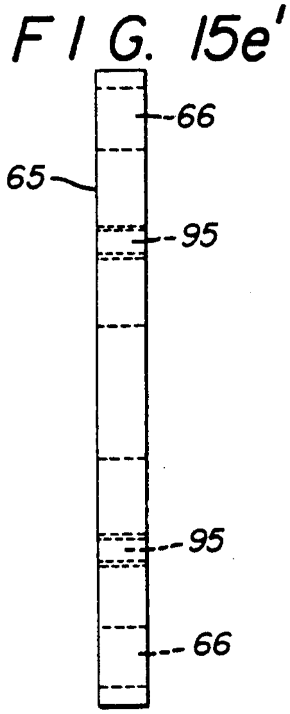
FIG. 15e
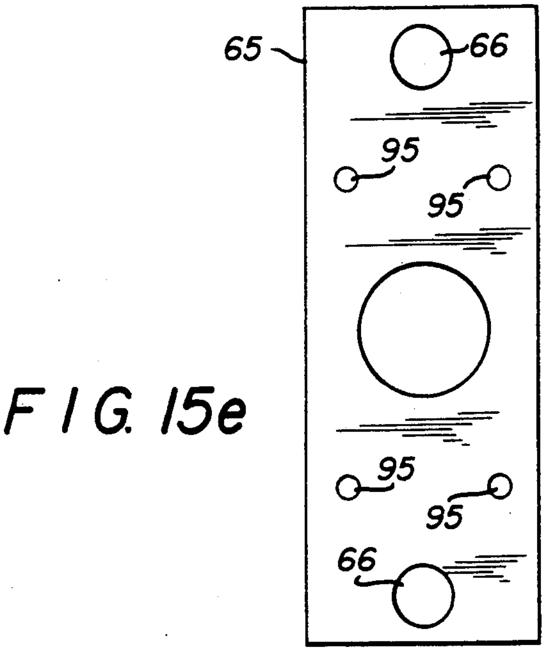

TANK ENTRY PROCEDURE AND APPARATUS

RELATED PATENT APPLICATIONS

This application is related to the following commonly assigned patent applications which were filed on the same date as this application:

U.S. application Ser. No. 07/464,873, entitled: Method And Apparatus For The Removal Of Black Oil Residues From Tanks.

U.S. application Ser. No. 07/464,867, now Pat. No. 4976,278, entitled: Method For The Recovery Of Black Oil Residues.

U.K. application 8902171.1, entitled: Method And Apparatus For Introducing And Positioning A Tank Contents Removal Means.

BRIEF DESCRIPTION OF THE INVENTION

A method and apparatus for gaining access through a manway to the interior of a tank which contains a substantial amount of flowable material, such as crude oil and/or heavy fuel oil residues without significant loss of such material. The invention allows easy removal of such flowable material from the tank without spillage and adverse enviromental impact.

BACKGROUND TO THE INVENTION

In the course of handling crude oil and refined petroleum products, the small percentage of residues which are present accumulate in storage holding areas because with time in storage such residues separate from the basic crude oil or the refined petroleum. The amounts of these residues that accumulate depends on the crude oil or refined petroleum being stored. Complicating this condition is the fact that in one way or another, water and siliceous materials are introduced to the holding areas and accumulate with the residues. These residues have fuel value. However, gaining access to them within the holding areas is difficult until the holding area is free of its normal storage, and even then, the recovery of the residues is a problem. In the past, after the area was free of the normal storage, crews were sent into the area and they shoveled the residues out. Vacuum suction has been used to remove the separate layer of water either before or after the work crews entered the area. Because the resolution of this problem was so labour intensive and hazardous, and carried out irregularly, there has been a lessened inclination to clean the storage holding areas, consequently many of them have large accumulations of such residues and water. This has introduced a massive problem for the refiner which involves serious economic and enviromental penalties.

Owing to an inability to recover these residues effectively and economically and to render them useful as fuels, residues of crude oil and/or heavy fuel oil, and the like, have low commercial value. They commonly have high viscosities, and contain, among other things, insoluble carbonaceous particulate matter, sand, other inorganic particulate materials and/or water. As a result, they have been discarded into pits or ponds which over time have become serious enviromental problems and imposed significant problems in land utilization.

The complexity of the problem deserves a more thorough discussion. Crude oils, heavy fuel oils, and the like, are typically stored in holding tanks having a capacity of from about $2.5\times10^5$ to $15\times10^6$ gallons or more. They may be left in the tank for weeks at a time, consequently insoluble residues have ample opportunity to precipitate within the oil in the tank and settle to the bottom of the tank where the insoluble residues may become assimilated with any water layer present.[1] With time, the volume occupied by these residues (and sludges) within the storage tank becomes appreciable. This volume will continue to build with each succeeding charge of oil into the storage tank thereby reducing the storage volume of the tank for the desirable crude oils and heavy fuel oils.

1. Water has a higher specific gravity than oil and settles to the bottom of the tank.

Eventually, either to maximize and restore the holding capacity of the tank or to empty the tank for purposes of inspection or repair, and the like considerations, these residues (sludges) have to be removed from the tank. As mentioned earlier, the problem had been met by workers entering the tank through its manways or an upper opening (e.g., top cover), and proceeding to shovel the sludge out of the tank. Not only is this primitive technique labour intensive, and time consuming, resulting in an inordinate amount of downtime for the tank, it also creates serious health and environmental problems. Other sludge removal techniques have been developed including, for example, vacuum suction utilizing negative pressure, dilution with a solvent such as light gas oil/distillate, and the like. While these techniques are perhaps improvements over manual recovery of residues from tanks, they are expensive and still pose health, safety and ecological problems. They give little thought to recovering and treating the removed residues in an economical and efficient manner. In addition, the use of solvents adds a significant cost since the solvent has value in commerce.

The residues shoveled or otherwise taken from the tanks have been carted in batch operations from the tank storage areas to large excavated holes in the ground where they are deposited to create pits or ponds of such residues. These residues eventually transform into pitch. With time, the pits or ponds have grown into substantial enviromental headaches for the refiners and their purlieus.

As the value of petroleum has increased in the past decade, coupled with recognition that the accumulation of residues is a problem that will not go away, and has to be dealt with, more interest has been taken in the energy values of the residues because only in the effective utilization of the residues as a fuel or raw material can the enviroment be cleaned up. Key to energy value attractiveness of these residues are two factors:

1. low cost recovery of the residues from the tanks;
2. low cost purification of the residues which allows them to be blended off either as a fuel or as a refinery raw material.

However, inasmuch as access to these tanks is generally accomplished by means of the manways, which are typically located at the lower portions of the side(s) of the tanks, residue removal techniques, regardless of the specific procedure employed, have generally been carried out on a frequent enough time interval so as to prevent the height of the accumulating residue material within the tank from reaching a level which is higher than the height of the manway location which would, of course, present serious problems in gaining access to the tank and the contained residues.

A need accordingly exists for a process which provides an economical and efficient means for removing crude oil and/or heavy fuel oil residues, and the like, from a storage tank in a safe and ecologically sound manner and which, moreover, also provides for the recovery of such removed residues so that they can be economically utilized. A need also exists for the ability to gain access to a tank through its manway so as to provide means by which such removal is effected even when the height of the material within the tank is completely above the height of the upper portion of the manway.

THE INVENTION

This invention is directed to the low cost recovery of residues from storage areas, such as tanks, without creating health hazards. In addition, the invention allows the continuous removal of residues from a storage tank thereby supporting continuous processes for the purification of the residues for the purpose of recovering fuel and/or raw material values.

The invention relates to a method and apparatus for gaining access through a manway to the interior of a tank which contains a substantial amount of flowable material, such as crude oil and/or heavy fuel oil residues without significant loss of such material. The access is effected by way of the tank's one or more manways in a manner such that the manway cover plate is removed with, at most, insignificant loss of flowable material. The invention includes provision for an adapter containing flowable material removal means. The flowable material removal means is subsequently introduced into the interior of the tank, without significant loss of the contents of the tank.

More particularly, the invention embraces a method for gaining access to the interior of, e.g., an enclosure, such as a tank, which has an open passageway communicating with the interior and exterior of the enclosure. The exterior end of the passageway terminates at a passageway flange surrounding the opening at the extreme end thereof with a securable cover plate attached thereto, preferably by a plurality of securing means, to form a cover plate/flange assembly that seals the opening to the passageway from the outside. The method comprising:

a) inserting a blanking plate between the cover plate and the passageway flange whereby the blanking plate seals the passageway opening, preferably by removing the securing means from one portion of the cover plate and passageway flange assembly and inserting the blanking plate between that portion of the assembly;
b) securing the blanking plate to the passageway flange;
c) removing the cover plate;
d) juxtaposing adjacent to the blanking plate an adapter member having an adapter flange at one end thereof that may be mated to the passageway flange (preferably, the adapter flange mates with and is substantially coextensive with the passageway flange) and at least one or more ports providing access to the interior of the adapter member and thence to the enclosure through the passageway;
e) securing the adapter member flange to the passageway flange; and
f) removing the blanking plate.

The method of the invention includes the use of a separating means which is affixed to the cover plate, to separate the cover plate from the passageway flange and to allow for the insertion of the blanking plate between the cover plate and the passageway flange. In a preferred embodiment of the invention, the separating means is air or hydraulic cylinders.

In a preferred embodiment of the invention, the longitudinal dimension of the blanking plate which is in the same direction of insertion is greater than the corresponding dimension of the cover plate/passageway flange assembly thereby providing a blanking plate extension at one or both longitudinal ends of the blanking plate after its insertion between the cover plate and the passageway flange. In another preferred embodiment of the invention, the latitudinal dimension of the blanking plate is greater than the corresponding dimension of the cover plate/passageway flange assembly thereby providing an extension of the blanking plate at one or both latitudinal ends of the blanking plate, beyond the flange, after its insertion between the cover plate and the passageway flange. In these embodiments, the blanking plate is secured to the passageway flange at the extensions of the blanking plate. In the typical practice of the invention, the blanking plate has a surface area large enough to seal the passageway.

In another preferred embodiment, the blanking plate is secured to the passageway flange by at least one U-shaped clamping member and bolting means, the clamping member having two legs, one leg being longer than the other leg, the end of the longer leg being juxtaposed against the blanking plate and the end of the shorter leg being juxtaposed against the passageway flange, and the bolting means passes through the blanking plate and clamping member.

The adapter member may be provided as a housing for a variety of equipment which may be used for entry into the enclosure and recovering material from within the enclosure. For example, the housing may be used to contain a submersible pump that is introducible to the enclosure's interior.

BRIEF DESCRIPTION OF THE DRAWINGS

FIG. 1 is a schematic diagram of a storage tank showing a side mounted manway.

FIG. 4C is an isometric drawing of a clamp which may be used to secure the blanking plate to the manway flange.

FIG. 7*a* is a schematic diagram of the next step in the sequence showing the positioning of the adapter with the manway and its manway flange.

FIG. 7*b* is a schematic diagram showing the front view of FIG. 7*a*.

FIG. 8*a* is a schematic diagram of the next step in the sequence showing a side view of the adapter being secured to the manway flange with the blanking plate still secured in place.

FIG. 8*b* is a schematic diagram showing the front view of FIG. 8*a*.

FIG. 9 is a schematic diagram of the next step in the sequence showing a side view in which the means securing the blanking plate to the manway flange has been removed.

FIG. 10 is a schematic diagram of the next and final step in the sequence showing a side view of the adapter being secured to the manway with the blanking plate having been removed.

FIG. 11 is a schematic diagram showing a spill tray and supporting members positioned beneath the manway flange and cover plate assembly.

FIG. 15*c* is a top view of a portion of the cover plate showing the holes to be drilled on each side of an existing bolt hole to accommodate the mounting of the air cylinder.

FIG. 15*d* is a top view of the anchor plate used to secure the air cylinder to the manway flange and cover plate.

FIG. 15*d'* is a side view of FIG. 15*d*.

FIG. 15*e* is a top view of the mounting plate used to secure the air cylinder to the manway flange and cover plate.

FIG. 15*e'* is a side view of FIG. 15*e*.

FIG. 19*a* is a schematic diagram of another side-mounted manway.

FIG. 19*b* is a schematic diagram of a blanking plate which may be used in conjunction with the manway of FIG. 19*a*.

FIG. 19*c* is a schematic diagram showing the blanking plate of FIG. 19*b* partially inserted between the manway flange and the cover plate of the manway of FIG. 19*a*.

Detail Description Of The Invention

Figure 1A:
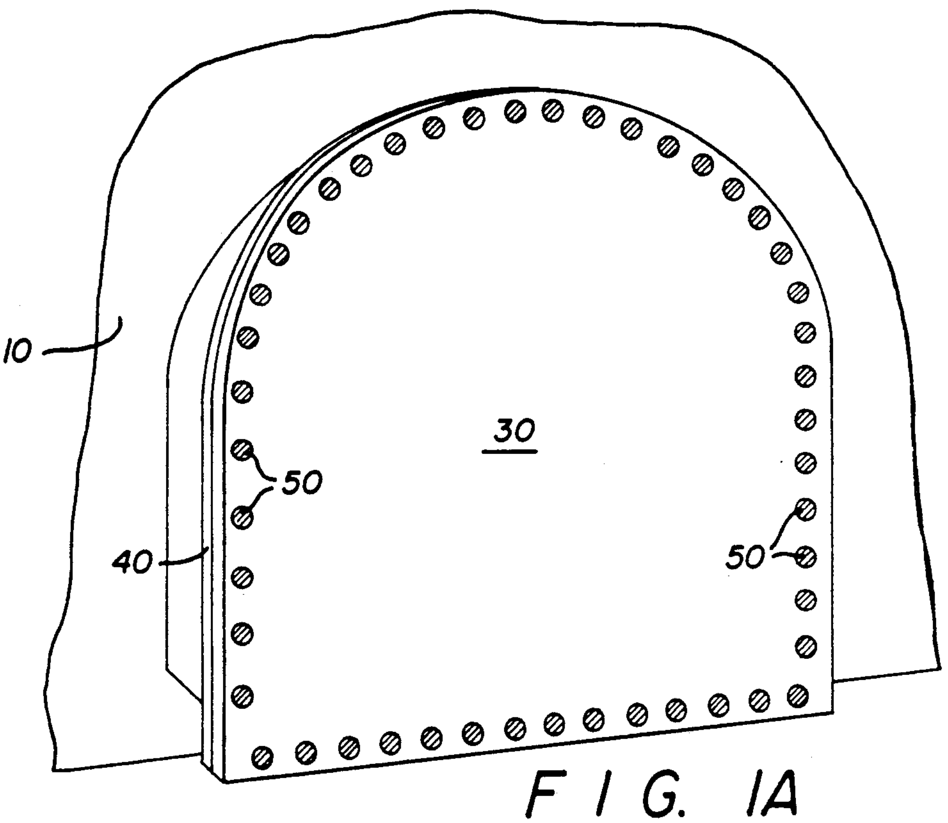
FIG. 1A is a schematic depiction of a typical manway and its corresponding cover plate secured thereto.

Overall, this invention may be part of system directed to the economical and efficient recovery of crude oil and/or heavy fuel oil residues such as sludges, slop oils, pitches, waxes, bottoms, and the like, which typically build up in crude oil/heavy fuel oil storage tanks. This invention is specifically directed to a method of gaining access to such tanks thereby providing the initial step of the system for the removal of these residues.

The system of which this invention is a part, is a process for the economic and efficient recovery of crude oil or heavy fuel oil residues, or other similar such residues, from storage tanks and avoids substantially all of the disadvantages noted above. As a result of this process, oil is recovered from the residue of the tank which, when blended with crude oils at predetermined rates, is suitable in every respect for use as a refinery feedstock.

This system includes a novel technique for gaining access to the tank for the introduction of the residue removal means, even when the oil content of the tank is at a height which is above the height of the manway. The present invention provides the means of gaining access to the tank by means of the manway.

Generally, this system is discussed in detail in co-pending U.S. application Ser. No. 07/464,873, and involves a first step of thermal mobilization of the residue materials with a hot circulating liquid heating medium, preferably water, which is introduced to the interior of the tank. This heating of the residue material with the liquid heating medium lowers its viscosity and thereby enables the residue removal means, such as a submersible pump, to remove the residue at an optimum pumping and recovery rate.

In view of the relatively high viscosity and possible high solids/sludge content of the residue to be recovered, it is most desirable to have the residue removal means introduced directly into the tank thereby reducing to zero the suction length, in contrast to prior art techniques, thus greatly increasing the handling rate.

The resultant mobilized residue contents of the tank are then continuously removed and fed to a separation zone for the removal of the entrained liquid heating medium and particulate matter. The separation zone may comprise strainers, decanter centrifuges, centrifugal centrifuges, and the like. If desired, chemical additives may be employed in the separation zone to assist in the removal of the liquid heating medium, particularly when the medium is water; to reduce the pour point of the recovered hydrocarbons: and to stabilize the hydrocarbons to improve their compatibility with the virgin crude oil with which the recovered and treated hydrocarbons are blended.

The overall process of this system provides an efficient and economical means to release and recover the entrapped hydrocarbon residues from the tank bottoms and brings a source of additional revenue to a refinery in contrast to the prior art in which those same refineries have had to expend considerable sums for the removal and safe disposal of these residues.

By virtue of this overall system, the amount of downtime that a storage tank is subjected to in order to remove its residue content is reduced to a fraction of the time that is conventionally required. Moreover, this system does not require the need for personnel to enter the tank. That feature along with the use of a closed loop system for thermally mobilizing and removing the residue from the tank presents an environmentally safe process for both the ecology and the personnel involved.

In order to carry out the system it is necessary to be able to gain access to the interior of the tank so as to be able to introduce the liquid heating medium to induce mobilization of the residue and, most importantly, to be able to introduce the residue removal means, such as the submersible pump. The manways of the tank are generally designed to accommodate manual entry and accordingly are of a size which can easily accept the introduction of the heating means as well as the removal means of the overall process. The problem, however, is being able to remove the cover plate of the manway, which is typically just a "blind flange," i.e., a continuous plate with no openings, and replace it with an adapter which can house the removal means and through which the liquid heating medium can also be introduced, without an appreciable loss of the contents of the tank. There is described herein a technique for doing just that. By virtue of this invention, the cover plate of a manway is removed and replaced with an adapter without any appreciable loss of the contents of the tank, even when the contents are at a level above the height of the manway.

In particular, in its broadest embodiment, the technique of the invention involves first inserting a blanking plate between the cover plate and the manway flange to which the cover plate is secured and securing the blanking plate to said flange. The cover plate is then removed while the blanking plate is still in position and effectively retaining the contents of the tank. The adapter is then placed in position and secured to the manway flange as well. The blanking plate is then removed and the recovery process is ready to begin.

As used herein, and as will be discussed more fully herein below, a "blanking plate" is a transitory covering plate for the manway which is specifically designed such that it has a width which is less than the width of the existing cover plate while still having a surface area which is large enough to seal the manway entranceway completely. In this manner, once a number of the bolts (or whatever other securing means is used to hold the existing cover plate in place) are removed from a portion of the cover plate and the remaining bolts (or their equivalent) are loosened, the blanking plate can then be inserted between the manway flange and the cover plate, being introduced at that portion of the cover plate from which the bolts have been removed, generally the top portion. Due to the narrower width of the blanking plate, it does not interfere with the bolts which are still in place along the direction of travel of the blanking plate. The blanking plate is then temporarily secured to the manway flange by a means which does not interferre with the subsequent removal of the cover plate. Once the remaining bolts (or other securing means) are removed, the cover plate is removed and replaced with the adapter, which preferably has an integral flange which substantially mates with the manway flange so as to provide a leak-proof, tight sealing arrangement. The bolts (or other equivalent securing means) are added to the adapter flange securing the adapter to the manway flange in a sequence that is typically in reverse of that used for removing the cover plate.

Once the bolts have been returned on opposing sides of the adapter flange thereby partially securing the adapter to the manway flange, the blanking plate is removed by moving it in the direction opposite to that traveled during its insertion. The adapter is then completely secured to the manway flange by replacing all of the bolts (or other securing means) and the operation is then complete.

Although this technique for gaining access to a substantially filled tank has been specifically identified with the recovery of residues from the bottom of storage tanks, it should be readily evident that this technique is clearly not limited to what is contained within the tank or the type of tank that is being used. Indeed, this technique for gaining access to a substantially filled tank through its manway without any appreciable loss of the contents of the tank is applicable to any type of enclosure and to any material contained therein. The object is to replace the cover plate of the manway entranceway with an adapter which is capable of permitting access to the interior of the enclosure and meeting the special needs of the specific application without any appreciable loss of the contents of the enclosure.

In a majority of crude oil and/or heavy fuel oil storage tanks, access to the interior of the tank can be made by at least one side mounted manway. These tanks are quite large as noted above. The tank entry accessing technique of the present invention is applicable for any size tank or enclosure.

Accordingly, the manways are correspondingly large and are made to easily accommodate manual entry. Consequently, these manways are also large enough to accommodate the introduction of the residue removal means, such as the submersible pump noted above.

In order to better describe this invention, reference is made to the drawings. The same reference numerals are used throughout the drawings.

A typical storage tank with a side-mounted manway is illustrated in FIG. 1. Although the tank shown is cylindrical in shape, it is understood that any storage enclosure is applicable to be accessed by means of the present invention regardless of its geometric shape.

Figure 3A:
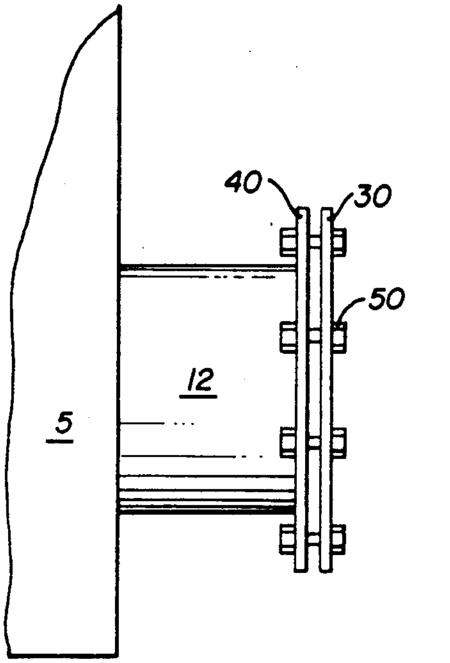
FIG. 3*a* is a schematic diagram of a side view of a tank and its side mounted manway showing the cover plate attached to the manway after a number of bolts have been removed in preparation for the insertion of the blanking plate.
Figure 3B:
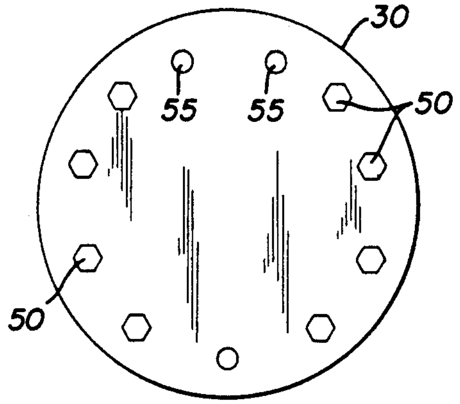
FIG. 3*b* is a schematic diagram of the front view of FIG. 3*a*.

A typical crude oil storage tank manway 3 is more specifically described in FIGS. 3A and 3B. FIG. 1A shows another shape for the manway 3 fitted into tank sidewall 10 and possessing cover plate 30. The cover plate 30 is held in place by forty-four bolts 50, each 2.54 cm in diameter, which is secured to manway flange 40. A schematic side view of this arrangement is shown in FIG. 11. Needless to say, the invention is not restricted to the use of cover plates with 44 bolts.

Referring to FIG. 11, the manway comprises an entry neck or passageway 12 which is secured to side wall 10 of tank 5 which rests on a base 35. Manway flange 40 is an integral part of passageway 12 and is the means to which the cover plate 30 is secured to the manway. Generally, there is a sealing gasket (not shown) between the manway flange and the cover plate to provide for a tight seal. This gasket has typically been made of asbestos but due to recent health concerns about this material, applicable substitutes have been utilized.

Desirably, the size and shape of cover plate 30 is such that it substantially mates with and is coextensive with manway flange 40 so as to provide a good strong seal. Although the design of cover plate 30 and its mating manway flange 40 is somewhat rectangular having an arch as its upper portion, it should be readily understood that the present invention is applicable for use with any manway design, be it circular, rectangular, oval, and the like, or any combination thereof. The only thing that will change in each such embodiment will be the design and shape of the corresponding blanking plate which will be discussed more fully below.

Before beginning the accessing operation, it is desirable to reduce the hydrostatic head inside the tank as much as possible by the removal of the crude oil, heavy fuel oil, and the like, leaving behind, to the extent possible, only the residue material. It is assumed, of course, that even with the removal of as much of the tank's contents as possible, the residue level may be at a height which is still higher than the height of the bottom of the manway.

One of the first operations that should be carried out is checking out the length of bolts 50. In order to permit the insertion of the blanking plate between the manway flange and the cover plate, it is necessary that the bolts be of adequate length. Generally, the bolts should be long enough to accommodate the thicknesses of the existing manway flange, the gasket and the cover plate in addition to the subsequently added thickness of the blanking plate plus a clearance distance of about 3 mm. If the bolts are not long enough to permit this added length, they need to be replaced with suitably longer bolts.

Referring to FIG. 11 again, it may be desirable, although certainly not necessary, to place a spill tray 15 in position beneath the manway flange/cover plate assembly to catch and contain any spillage of oil/sludge during the accessing operation. The provision of a small centrifugal pump (not shown) helps in the disposal of spillage liquids.

During the accessing operation, it is desirable to avoid having the weight of the cover plate (typically about 300 kg) and the other components hang from bolts 50. Not only would this interfere with the ease of retightening these bolts but would also cause alignment problems for the removal or insertion of yet other bolts. So too, it is not impossible for the weight of the cover plate and its components to even damage the bolts themselves.

Accordingly, it is advantageous to place support members 20 as shown in FIG. 11 immediately beneath manway flange 40 and cover plate 30 to support the weight of these components when the bolts are slackened off. As shown, the support members may be placed inside of spill tray 15 so as to be more appropriately positioned.

The support members 20 may be made of any material provided that is of adequate support strength to accommodate the weight of the plates. Sound timber, for example, is quite suitable.

If the support member does not have a smooth upper surface upon which the manway flange/cover plate assembly rests, it may be desirable to provide a plate 25 on top of the support member having a smooth surface which has been advantageously greased on the side which is in contact with the assembly to facilitate slideable movement of the cover plate across plate 25. Plate 25 may be comprised of any suitable material and typically is made of steel. The thickness of plate 25 should be ample enough to accommodate the weight of the resting manway flange/cover plate assembly, which at one point in the operation also includes the weight of the blanking plate as well, and generally should not be less than about 10 mm.

Figure 12:
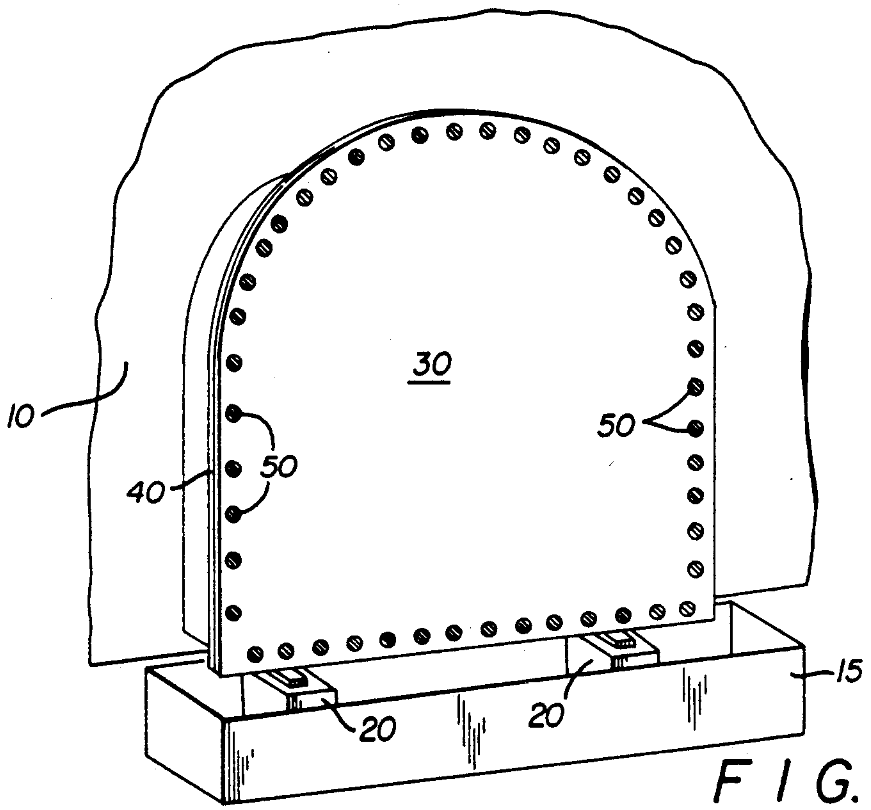
FIG. 12 is a schematic depiction of the structure shown in FIG. 1A with a spill tray and support members positioned beneath the manway flange and its cover plate.

FIG. 12 depicts the structure shown in FIG. 1A with spill tray 15 and support members 20 in place.

In order to position and secure a means for separating the cover plate from the manway flange after a number of bolts have been removed or loosened, which will be discussed below, it is now necessary at this stage of the accessing operation to prepare for the installation of this separating means.

In a preferred embodiment of this invention, the means for separating and spacing the cover plate apart from the manway flange so as to permit insertion of the blanking plate between these two components are air and/or hydraulic cylinders. A plurality of these air cylinders are positioned and secured around the outer face of the cover plate. Six of such air and/or hydraulic cylinders are shown affixed to the manway cover plate in FIG. 14.

When utilizing air and/or hydraulic cylinders as the separating means, both the cover plate and the manway flanges must be drilled and tapped to accommodate air/hydraulic cylinder holding bolts which are used to secure the cylinders to the manway flange/cover plate assembly. These cylinder bolt holes are situated one on each side of a number of the bolts securing the cover plate to the manway flange.

In particular, referring to FIG. 15*c* which shows a portion of the cover plate detailing the positioning of a pair of air and/or hydraulic cylinder bolt holes which need to be drilled, bolt 50 is shown to still be in place. Bolt holes 55 and 55' are also shown from which bolts have been withdrawn. On each side of bolt hole 55', a cylinder bolt hole 60 is drilled and tapped as shown.

Figure 2:
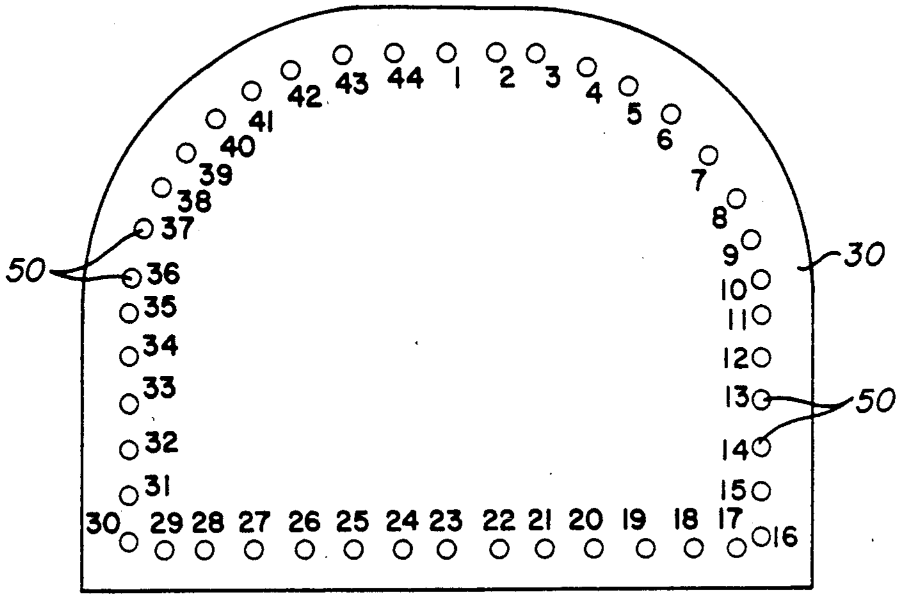
FIG. 2 is a schematic diagram of the manway of FIG. 1A and its corresponding cover plate with each of the securing bolt positions numbered for reference purposes.

Reference is now made to FIG. 2 which is a schematic diagram of the model manway shown in FIG. 1A, which particularly shows the cover plate and the bolts 50 which fasten the cover plate to the manway flange. Here, each of the forty-four bolts are consecutively numbered for reference purposes so as to be able to follow the subsequent steps which involve particular bolt positions, their removal, loosening, and tightening.

In order to accommodate the affixing of the air and/or hydraulic cylinders to the cover plate, cylinder bolt holes 60 are drilled and tapped on each side of the bolts in positions 10, 15, 19, 27, 31 and 36, resulting in a total of twelve holes being prepared. The precise positioning of the separating means 75, in this case, the cylinders, is not critical to the present invention. Thus, instead of positioning the cylinders at the bolt holes of position 10 and 36, for example, the cylinders could just as well have been positioned across the bolt holes at positions 11 and 35. So too, the other respective positions of the cylinders could also be moved to adjacent bolt holes or even further. What is required is that the separating means 75 be positioned such that it will not undesirably interfere with the easy, unhampered insertion of the blanking plate between the manway flange and cover plate and that it will provide the ability to effectively separate the cover plate from the manway flange when needed.

Accordingly, if the blanking plate is to be inserted from the top of the manway towards the bottom, which is the preferred manner of insertion (but not the only manner) inasmuch as gravity aids in lowering and positioning the blanking plate, then it should be clear that separating means 75 cannot be positioned at or near the path that will be traversed by the blanking plate. Thus, separating means 75 cannot be placed at the top of the manway in the embodiment in which the blanking plate is introduced from the top of the manway. Instead, the separating means is advantageously placed as close to the top of the manway as possible without actually interfering with the insertion of the blanking plate. But just placing the separating means at one area of the cover plate will generally not be enough to effectively separate the heavy cover plate from the manway flange in a controlled and balanced manner while still keeping the orientation of the cover plate constant, i.e., in a position such that the plane of the cover plate remains perpendicular to the axis of the manway. Accordingly, additional separating means are usually required, preferably positioned at least at the lower side positions, such as at bolt positions 14 and 32 or 16 and 30. It is noted that the separating means are preferably used in symmetrical pairs to obtain a balanced and synchronized separation. Yet additional separating means may also be provided at the bottom of the manway as well, as mentioned above.

The positioning of separating means 75 onto the manway in a manner which will not interfere with the insertion of the blanking plate and which will also provide an effective synchronized and balanced separation of the cover plate from the manway flange is well within the ability of one skilled in the art knowing these sought after objectives.

Figure 13:
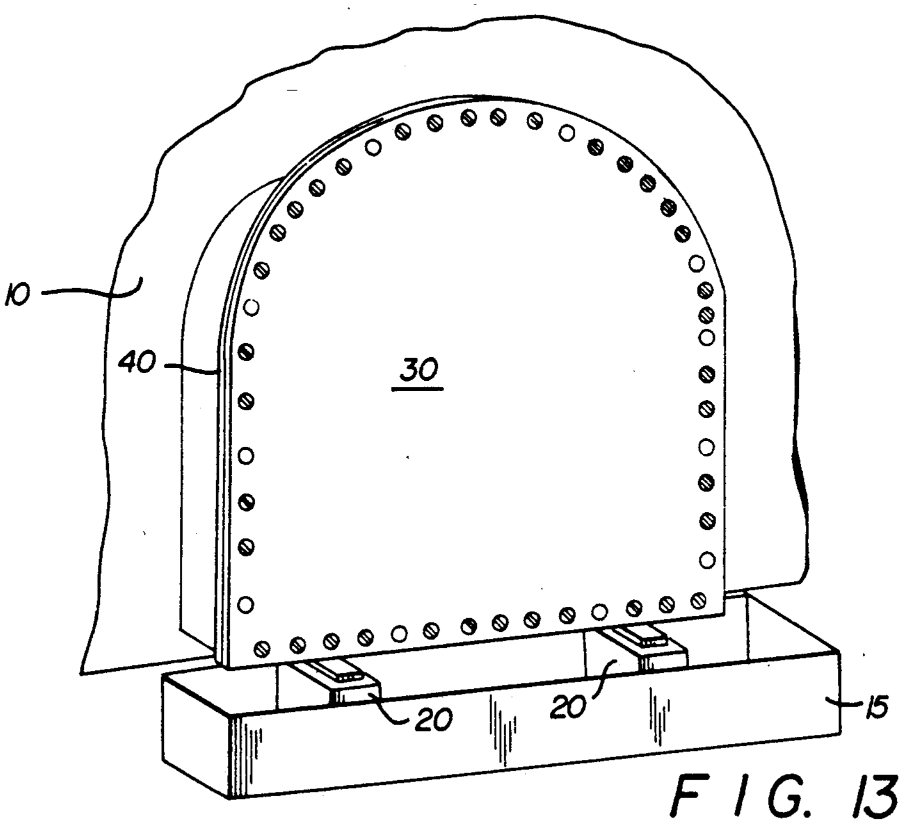
FIG. 13 is a schematic illustration of the structure shown in FIG. 12 depicting the additional step of having a number of bolts holding the cover plate secured to the manway flange withdrawn in preparation for the introduction of the blanking plate.

Once the air and/or hydraulic cylinder holes have been selected, drilled and tapped, the first stage removal of bolts 50 is preferably effected. Thus, the bolts in positions 37–43 and 3–9 are now completely removed. The bolts in positions 44, 1 and 2 are preferably left in place at this stage for additional safety and sealing capability. FIG. 13 shows a diagram of the structure of FIG. 1A at the stage of the accessing operation in which the first stage removal of a number of the bolts has been effected. The air and/or hydraulic cylinders are then positioned and secured in place as will now be described.

Figure 15A:
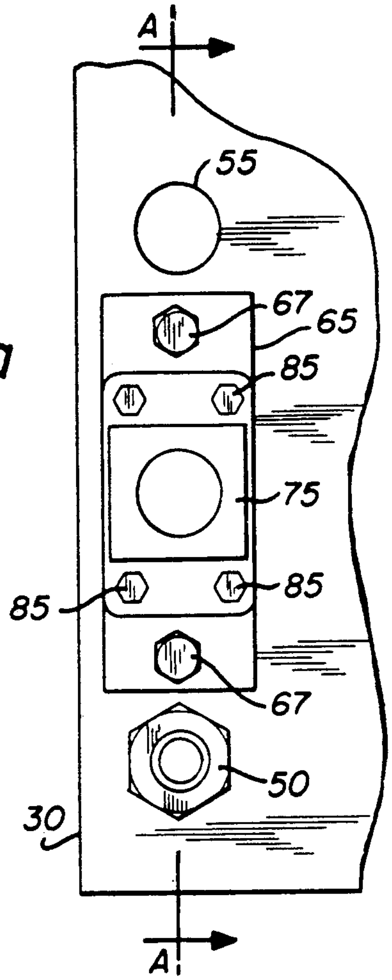
FIG. 15*a* is a top view of an air cylinder in place in the cover plate with its corresponding mounting plate and flange.
Figure 15B:
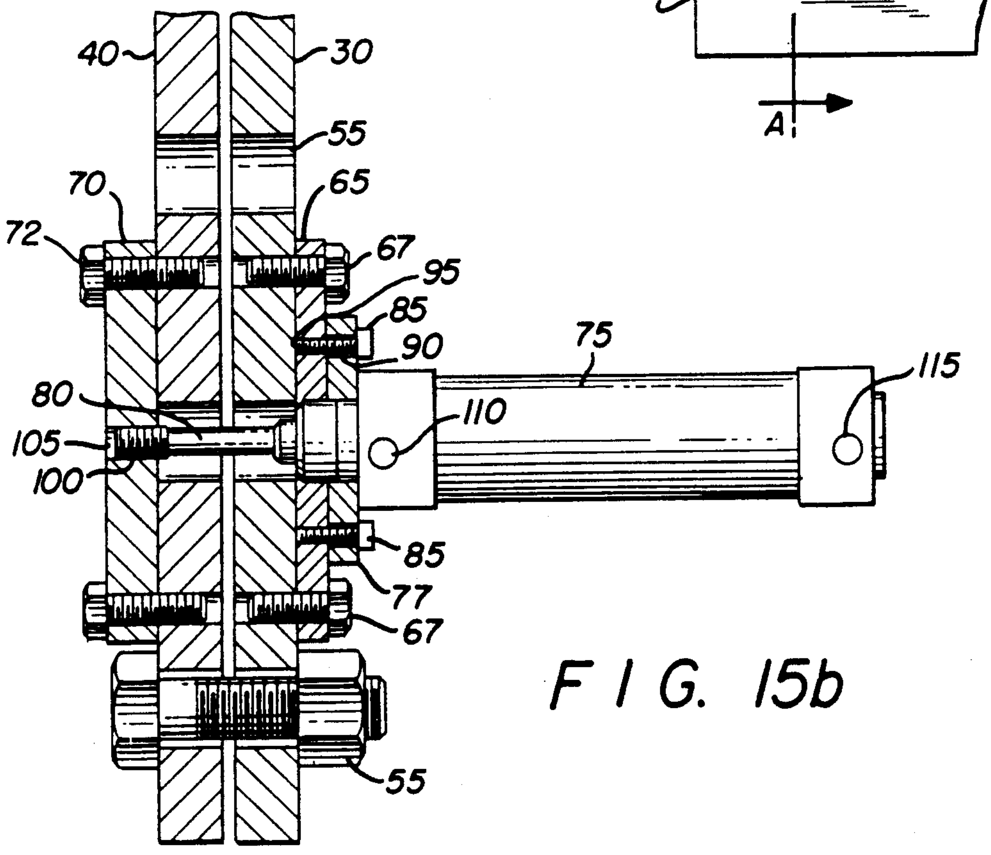
FIG. 15*b* is a cross-sectional side view taken along line A—A of FIG. 15*a* showing the mounting arrangement of the air cylinder on the cover plate and manway flange.

Referring to FIGS. 15*a*, 15*b*, 15*d*, 15*d*', 15*e* and 15*e*', air and/or hydraulic cylinder mounting plate 65 having mounting plate holes 66 which align with air and/or hydraulic cylinder bolt holes 60 which were drilled into the cover plate and manway flange is placed into proper position on the cover plate and fastened to the cover plate by mounting plate threaded bolts 67. Threaded bolts 67 must be of a length that is shorter than the thickness of the cover plate such that they do not protrude beyond the cover plate and thereby undesirably interfere with the subsequent insertion of the blanking plate.

An air and/or hydraulic cylinder anchor plate 70 is similarly affixed to the back face of the manway flange. Anchor plate 70 contains anchor plate holes 71 which are similar to holes 66 in the mounting plate and which also align with holes 60 of the manway flange/cover plate assembly. Anchor plate threaded bolts 72, essentially identical to mounting plate threaded bolts 67, are used to fasten the anchor plate to the manway flange. Here too, the anchor plate bolts must have a length which does not extend beyond the front face of the manway flange.

Figure 14:
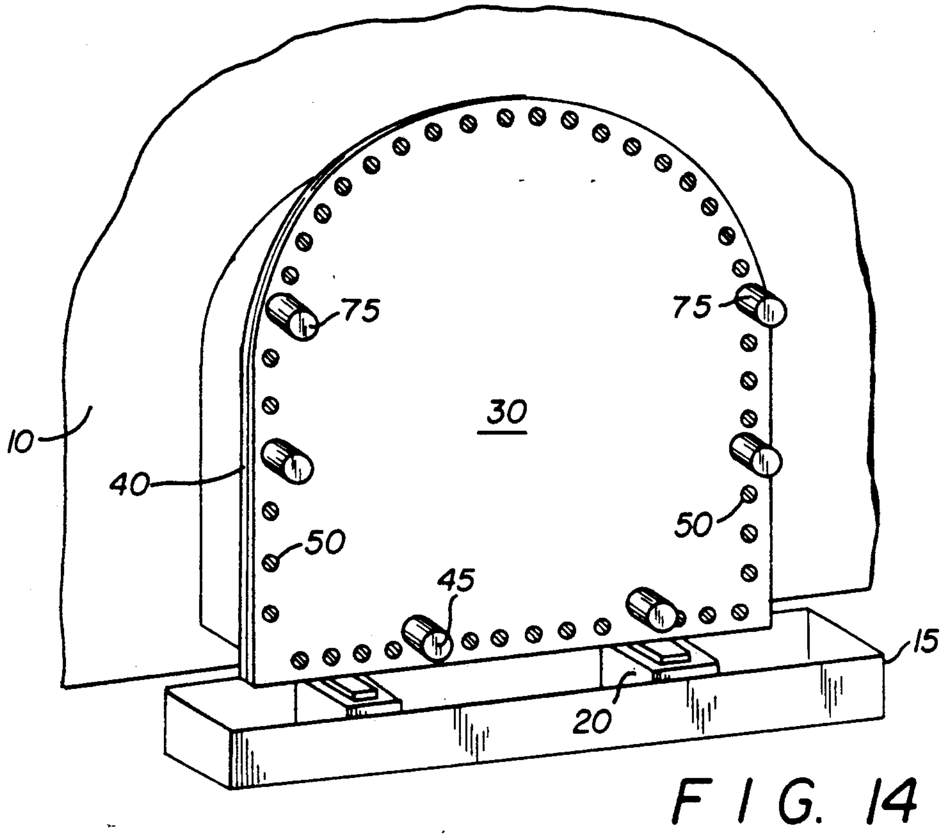
FIG. 14 is a schematic description of the structure shown in FIG. 13 depicting the next step in the sequence in which air cylinders have been added at a plurality of positions around the cover plate to aid in separating the cover plate from the manway flange to allow for the introduction of the blanking plate.

Air and/or hydraulic cylinder 75 having an integral flange 77 and a piston rod 80 is then affixed to the manway flange/cover plate assembly. Threaded air and/or hydraulic cylinder flange bolts 85 pass through flange holes 90 and are engaged in threaded mounting plate holes 95. So too, the threaded end 100 of piston rod 80 is engaged with threaded hole 105 of anchor plate 70. This procedure for affixing the anchor plate, mounting plate and air and/or hydraulic cylinder is repeated for each of the six air and/or hydraulic cylinder locations. FIG. 14 presents a diagram of the structure of FIG. 1A with all six air and/or hydraulic cylinders in position.

Each of the air and/or hydraulic cylinders is then connected to a compressed air and/hydraulic supply via ports 110 and 115. Preferably, the air supply should have a working pressure adjacent to the tank of desirably no less than about 7 bar (90 psi) or 70 bar (1000 psi) in the case of hydraulic oil, so as to provide ample force to carry out the separation and clamping tasks that it will be called upon to do. The air supply may be provided by any suitable means such as air compressors, cylinder supplies, or the like. The use of the higher pressure hydraulic medium permits the use of one or more of larger openings, larger closing forces and smaller size cylinders.

The application of compressed air to the front of the air and/or hydraulic cylinder, i.e., to port 110, will result in the cover plate and manway flange being clamped together. Conversely, the application of compressed air to the rear of the air and/or hydraulic cylinder, i.e., to port 115, will result in a separating force being applied to the flange and cover plate. The same system is employable when hydraulic cylinders are used.

It should be understood that although the above description of the separating means 75 has featured air and/or hydraulic cylinders, the present invention is not limited to just this embodiment, albeit preferred. Clearly, other separating means which are capable of effectively separating the cover plate from the manway flange to allow insertion of the blanking plate may also be utilized in the present invention. Such an alternative separating means may include something as simple as a ram which is positioned at the longitudinal axis of the manway and secured thereto by a cross member which is affixed to the cover plate. This ram, which may be connected to any power source, may be pushed in for sealing purposes or pulled away for separating purposes. The provision of a suitable and conventional separating means which is capable of performing the functions described herein is well within the skill of those familiar with this art.

Figure 16:
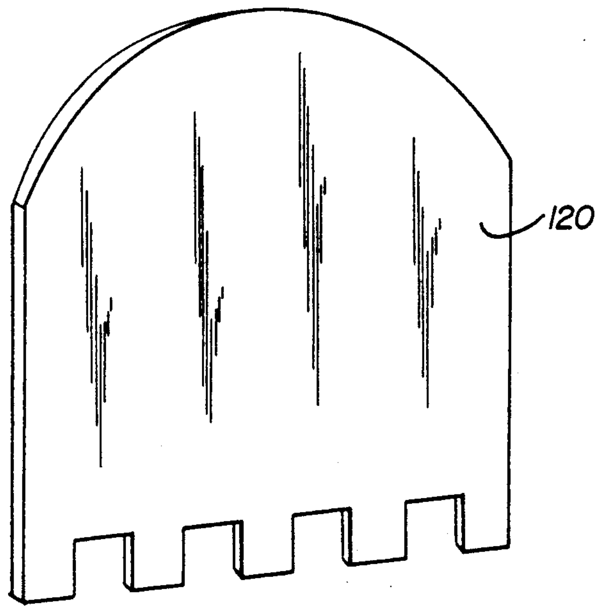
FIG. 16 illustrates a typical blanking plate which may be used in conjunction with the structure shown in FIG. 14.
Figure 19:
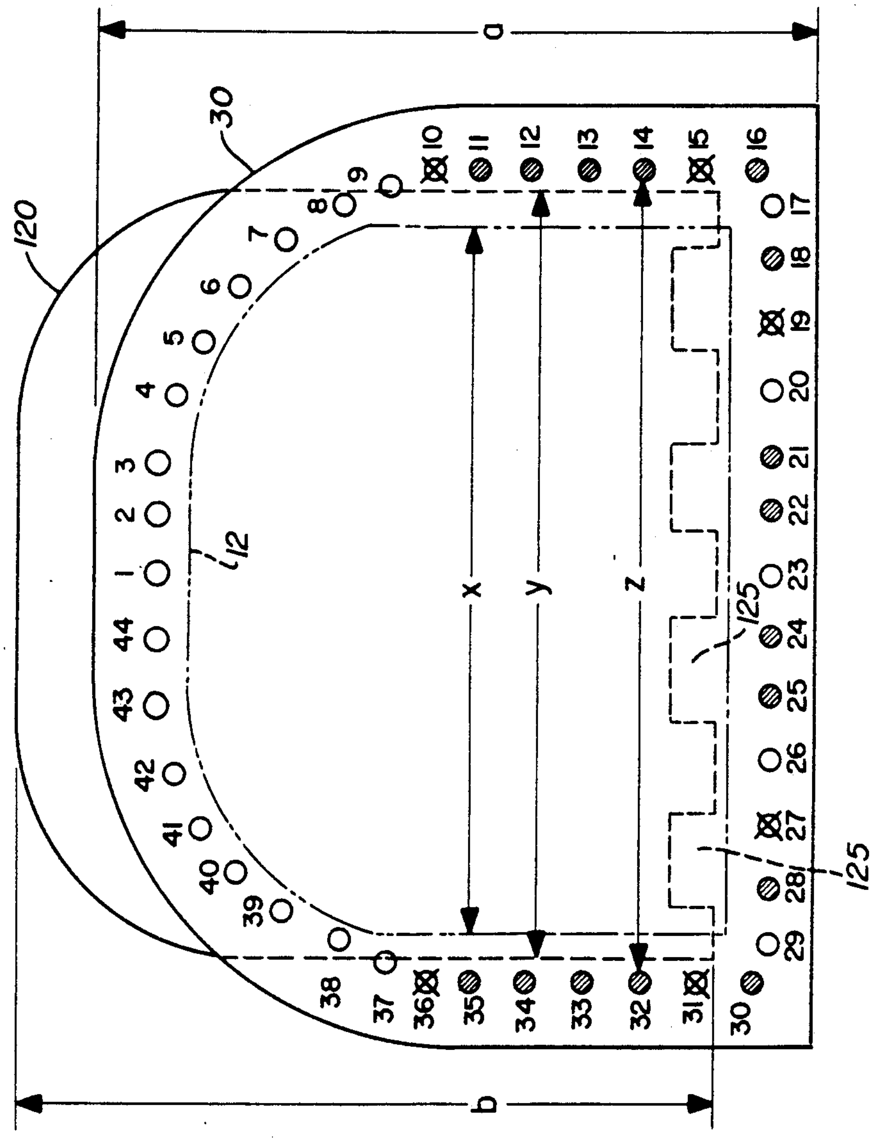
FIG. 19 is a schematic diagram of FIG. 18 showing the blanking plate partially inserted between the manway flange and the cover plate and showing the positioning of the bolts which are still present; the air cylinders; and the manner in which the blanking plate is able to slide down between the manway flange and the cover plate despite the presence of the remaining bolts.

A blanking plate is then prepared for the particular manway that is being accessed. The blanking plate 120 that is shown in FIG. 16 is especially suited for the model manway of FIG. 1A. Reference is also made to FIG. 19*a* in order to obtain a better understanding of the design of blanking plate 120.

Figure 22:
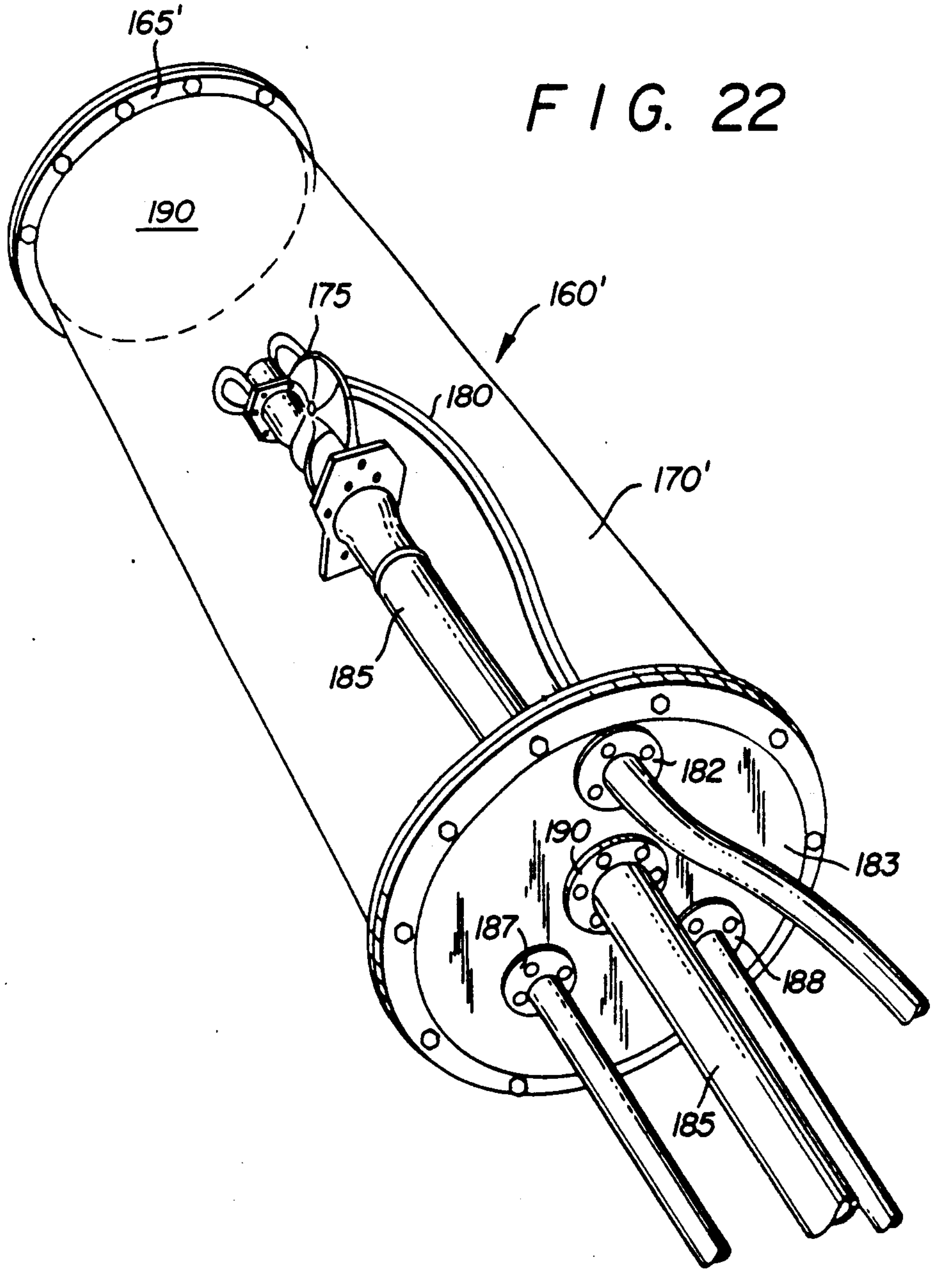
FIG. 22 is a schematic diagram of another adapter which could be used in conjunction with the manway of FIG. 19*a* and which represents the preferred embodiment of the present invention having a submersible pump positioned within the housing of the adapter as well as a plurality of openings at the end facing away from the tank which openings accommodate hydraulic drive lines for the pump and inlet and outlet lines for the introduction and removal of liquid heating medium.

As should be clear, the purpose of the blanking plate is to temporarily seal the manway entranceway while the cover plate is entirely removed and replaced with an adapter which allows access to the interior of the tank. In the context of the overall residue removal process of the present invention, the adapter housing contains a residue removal means as well as opening means to allow for the introduction and removal of various components. Such an adapter and its housing is illustrated in FIG. 22 which will be discussed more fully below.

In order to properly seal the manway entranceway and prevent spillage of the contents of the tank, it is necessary that the surface area of the side of the blanking plate facing the manway be at least as great as the entranceway of the manway. However, in order to get the blanking plate positioned between the manway flange and the cover plate in order to eventually remove the cover plate, it is also necessary that at least one dimension of the blanking plate, preferably its width, be narrower than the distance between the means that secures the cover plate to the manway flange, in this case the bolts. This can more clearly be seen by referring to FIG. 19*a*.

FIG. 19*a* is essentially the same as FIG. 2 but also shows blanking plate 120 as well as an outline of the entranceway to entry neck 12 shown by a dash-dotted line. Also shown in FIG. 19*a* is the positioning of the air and/or hydraulic cylinders denoted by an "X" over bolt positions 10, 15, 19, 27, 31 and 36. So too, each of the bolt positions has been denoted as they appear in the final stage of preparation for the insertion of the blanking plate by shading those bolt positions which still have bolts present therein and leaving unshaded those positions from which the bolts have been removed.

It is at least the surface area defined by the dash-dotted line of the entranceway which the blanking plate must have in order to effectively seal this passageway while the cover plate is removed. Thus, the blanking plate must have a width "y" which is greater than length "x", which is the width of the entry neck passageway. However, width "y" must be less than width "z", which is the distance between the bolts securing the cover plate and the manway flange on opposing sides of the cover plate. Generally, it is desirable to have distance "y", i.e., the width of the blanking plate, be at least about 1 to 2 cm. less than the width "z", the distance between the bolts measured from the center lines of the respective bolt holes. In this manner, there is ample clearance between the sides of the blanking plate and the sides of the bolts.

In order to be able to secure the blanking plate to the manway flange without interfering with the ability to remove the cover plate and the bolts that secure the cover plate to the manway flange, the height "b" of the blanking plate is preferably made longer than the height "a" of the cover plate/manway flange assembly, generally at least about 10 to 15 cm. longer and more preferably at least about 10.2 to 14.8 cm. longer. As such, a securing means can be provided which can secure the blanking plate to the manway flange by utilizing these extended sections of the blanking plate which protrude beyond the cover plate/manway flange assembly, preferably extending both at the top and bottom of the assembly.

Since a number of the bolts will generally be kept in place at the bottom of the manway to better keep the cover plate secured to the manway flange until the time is ready for its removal (bolts at positions 18, 21, 22, 24, 25 and 28) and, moreover, due to the presence of separating means which may also be situated at the bottom of the manway, for example, at bolt positions 19 and 27, it may be necessary to accommodate for the presence of these components as well by providing cutouts 125 in blanking plate 120 as shown in FIG. 19*a*. Of course, depending upon the number of bolts and/or separating means in place at the bottom of the manway and their position, the cutouts for the blanking plate will be modified accordingly.

Generally, although certainly not required, the blanking plate will usually have the basic contours of the manway. Thus, in FIG. 19*a*, the shape of the manway and therefore the preferable shape of the blanking plate is rectangular with an arch as its top end. It is not necessary, however, that the blanking plate follow the contours of the manway. If desired, the top portion of the blanking plate in FIG. 19*a*, for example, could be made square and/or the sides of the blanking plate could have been rounded or even tapered.

The manway itself need not have the shape depicted in FIG. 19*a*. Any shape is possible such as circular, completely rectangular, oval, and the like. A circular manway is shown in FIG. 19*a* with a corresponding circular-type blanking plate shown in FIG. 19*b*. As seen, the blanking plate in FIG. 19*b* is made such that it is provided with an extended length "c" which is greater than length "d" of the manway. FIG. 19*c* shows the blanking plate of FIG. 19*b* being inserted between the cover plate and the manway flange.

Regardless of the shape of the manway, the only requirements with respect to the blanking plate are that the surface area of the blanking plate be sufficient to completely cover the entranceway to the entry tank to avoid leakage and, at the same time, that the blanking plate be able to be positioned between the cover plate and the manway flange by clearing and avoiding any securing or separating means that may be present on the cover plate.

Once a desired blanking plate has been prepared which meets the needs of the particular manway and the positioning of the bolts still securing the cover plate, the next phase of the accessing operation is ready to begin.

Firstly, air and hydraulic pressure, as the case requires, is applied to the air and/or hydraulic cylinders to clamp the cover plate and the manway flange together, i.e., air and/or hydraulic oil is introduced to port 110 of the air and/or hydraulic cylinder. All bolts are then removed except for bolts in positions 11–14, 16, 18, 21, 22, 24, 25, 28, 30 and 32–35 which still remain in place. Of course, this final arrangement of the bolts represents only a preferred embodiment of the present invention. For example, if desired, bolts in positions 33 and 13 could have also been removed without any adverse affect upon the overall operation. Other variations in the positioning and removal of the bolts can also be made and still be within the scope of the present invention. What is desired, however, is that enough bolts are removed to allow for the insertion of the blanking plate, and preferably to also allow for at least a portion of the blanking plate to extend beyond the bottom of the manway for purposes of subsequently securing the blanking plate. The remaining bolts may all be left in place, if desired. Of course, an effective number of bolts necessary to keep the cover plate in place without leakage is always preferred. Indeed, it is preferable to have as many bolts remain in position as possible while still allowing for the insertion and securement of the blanking plate.

Figure 17:
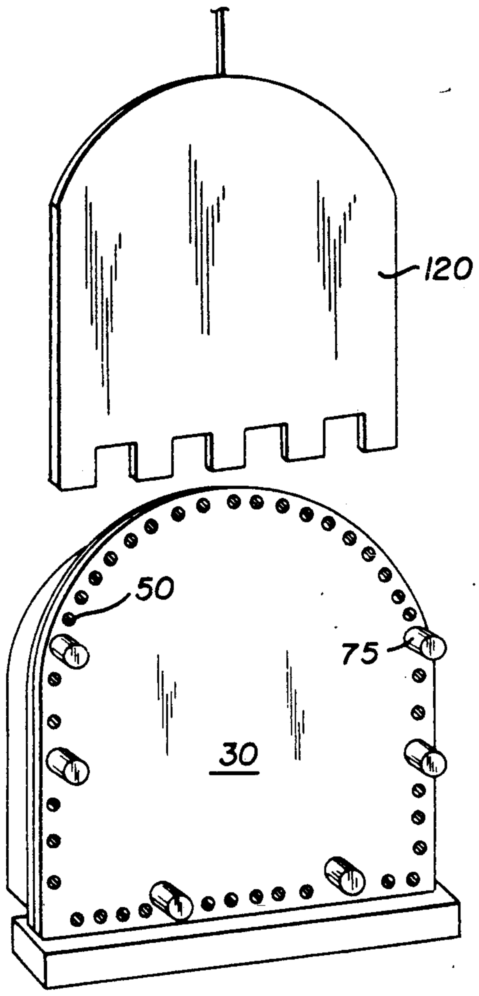
FIG. 17 shows the next step in the sequence in which the blanking plate of FIG. 14 is positioned above the manway ready for insertion between the manway flange and the cover plate.

The blanking plate is then readied for insertion by positioning it directly over the manway, typically by means of a sling or pulley arrangement. This step in the operation can be seen in FIG. 17.

All of the bolts still remaining in the cover plate are then loosened to allow for a clearance which is at least as wide as the thickness of the blanking plate plus an additional space of about 0.5 cm to 2.5 cm. The air and/or hydraulic cylinders are then operated to separate the cover plate from the manway flange by introducing air and/or hydraulic oil to the back of the cylinders at port 115. This forces the cover plate to move away from the flange to the extent allowed by the loosened bolts. The new separated position of the cover plate is illustrated in FIG. 11 by dash-dotted line 130 and is also shown schematically in FIGS. 3*a* and 3*b*.

Figure 18:
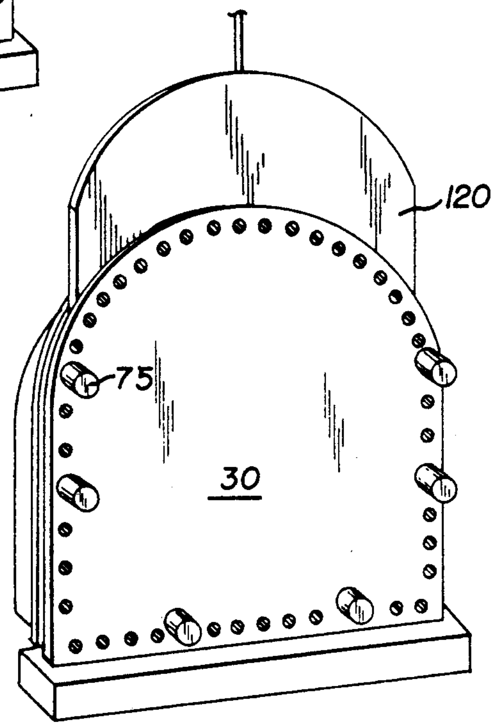
FIG. 18 shows the blanking plate from the position in FIG. 17 being partially inserted between the manway flange and the cover plate.
Figure 20:
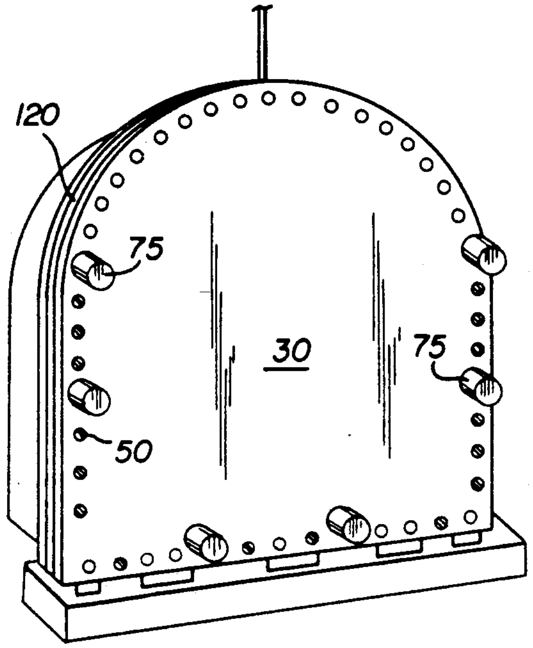
FIG. 20 shows the next step in the sequence in which the blanking plate of FIG. 18 is fully inserted between the manway flange and the cover plate.

The blanking plate is then inserted between the cover plate and the manway flange as quickly and as smoothly as possible, taking care not to disturb or tear the gasket which may be present. A diagram showing the blanking plate as it is being inserted can be seen in FIG. 18. FIG. 20 shows the blanking plate completely inserted.

The air and/or hydraulic cylinders 75 are then operated to clamp the blanking plate between the cover plate and the manway flange. The bolts are then retightened to temporarily lock the plates in place while the blanking plate is more firmly secured to the manway flange.

Figure 4A:
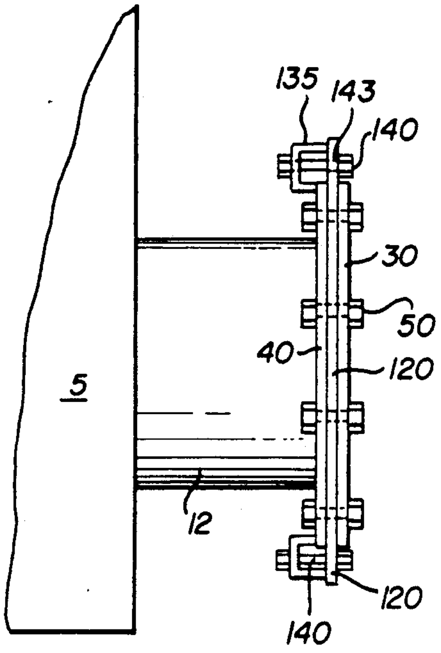
FIG. 4*a* is a schematic diagram of a side view of the tank and manway showing the next step in the sequence of steps of the present invention in which the blanking plate has now been inserted between the manway flange and the cover plate and has been secured to the manway flange without interfering with the movement of the cover plate.
Figure 4B:
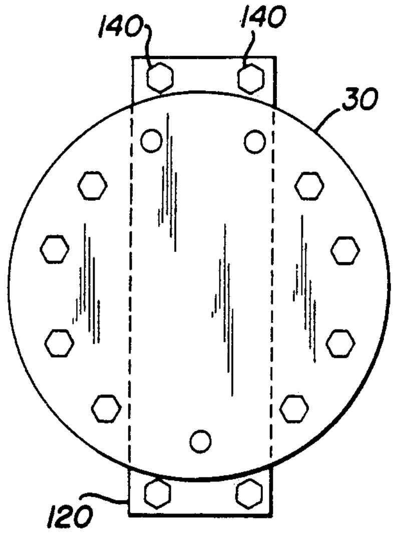
FIG. 4*b* is a schematic diagram of the front view of FIG. 4*a*.

In a preferred embodiment of the present invention, the blanking plate is secured to the manway flange by a U-shaped clamp 135 shown in FIGS. 4*a*, 4*b* and 4*c*, which is held in place by one or more clamp bolts 140 which are passed through holes 143 provided in blanking plate 120 and through coaxially aligned clamp hole 145. A least one such clamp 135 is used at the top and at the bottom of the blanking plate, respectively, as shown in FIGS. 4*a* and 4*b*.

The U-shaped clamp 135 is made in a manner such that one leg of the "U" is longer than the other to compensate for the thickness of the blanking plate. In use, the front face 150 of longer leg 152 is positioned against the side of the blanking plate facing towards the manway at its extended portions. Simultaneously, the front face 155 of shorter leg 157 is also positioned against the side of the manway flange which faces towards the manway. Understandably, the length "m" of longer leg 152 should not be substantially longer than the length "n" of shorter leg 157 for otherwise the cover plate will not be able to get drawn closer to the manway flange. Generally, the difference between lengths "m" and "n" is not much more than the combined thickness of the blanking plate and the gasket, if any. The tightening of clamp bolt 140 forces the blanking plate to be drawn closer to the manway flange.

It is to be understood that the use of clamp 135 to secure the blanking plate to the manway flange is not required and represents just one preferred method for doing so. Any means for effectively securing the blanking plate to the manway flange may be used provided that once in place, this securing means does not interfere with the subsequent removal of remaining bolts 50 and/or cover plate 30 from the manway. The selection of such an alternative securing means meeting these requirements is well within the abilities of those skilled in this art.

Figure 21:
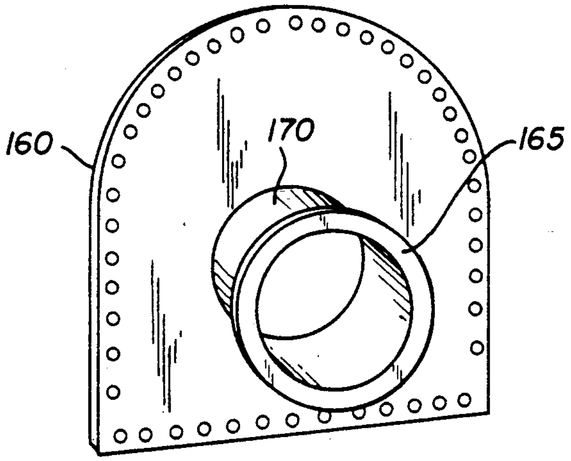
FIG. 21 is schematic illustration of an adapter and its integral flange which flange mates with and is coextensive with the manway flange of the structure shown in FIG. 20.

The adapter should now be readied for installation making sure that all orifices in its housing are blanked off and all valves, if any, are closed. Adapter 160 specifically designed for the model manway of FIG. 1A is shown in FIG. 21. It is noted that ideally, adapter flange 165 of the adapter is essentially identical to and preferably mates with manway flange 40. This is to ensure that the adapter will provide a good and effective seal with the manway flange and prevent the escape of the contents of the tank once the blanking plate is removed. Here again, while it is preferred that the adapter flange be coextensive and mate with the manway flange, it is not necessary that it do so.

An adapter 160' which is more closely applicable to the overall process of the present invention is illustrated in FIG. 22. There, the housing 170' is equipped with a submersible pump 175 which will ultimately be introduced inside of the tank and which will remove the crude oil/heavy fuel oil residues. The pump 175 is driven by hydraulic drive lines 180 which are introduced through seal 182 of front end 183 of the adapter. The submersible pump 175 is moved along the length of housing 170' and ultimately into the tank by movement means 185 which also communicates outside of the adapter through seal 190. A more detailed discussion of the operation of submersible pump 175 and movement means 185 is set forth in copending Ser. No. 07/464,873.

Front face 183 of adapter 160' may also include other openings which may be closed by valves, seals, or by other conventional means. In FIG. 22, seals 187 and 188 on front face 183 are used to allow for the introduction and removal, respectively, of the liquid heating medium which is used to thermally mobilize the viscous residues, as was discussed earlier.

Back face 190 of the adapter which has adapter flange 165' and which is directly attached to manway flange 40 is, of course, open such that it can freely communicate with and allow complete access to the interior of the tank.

The adapter is now positioned and readied for installation.

Figure 5A:
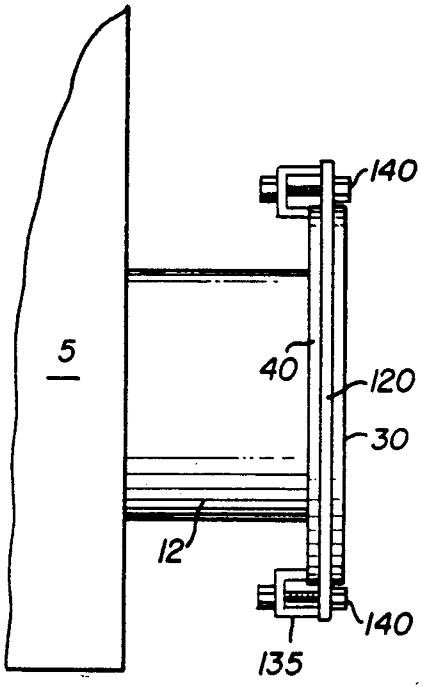
FIG. 5*a* is a schematic diagram of the next step in the sequence showing a side view of the removal of the bolts securing the cover plate to the manway flange while the blanking plate remains secured to the same manway flange.
Figure 6A:
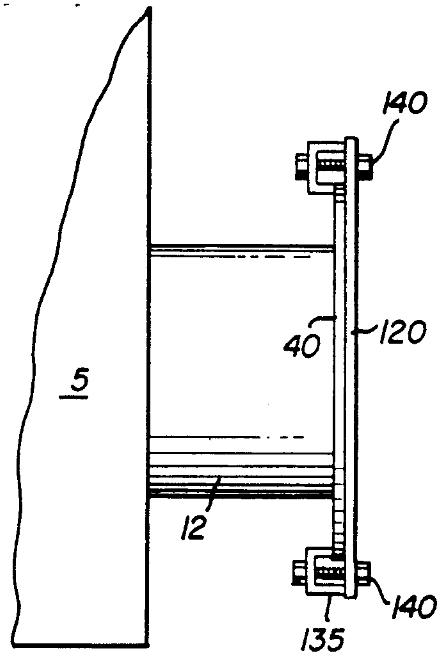
FIG. 6*a* is a schematic diagram of the next step in the sequence showing a side view of the manway and the blanking plate secured thereto after the complete removal of the cover plate.
Figure 5B:
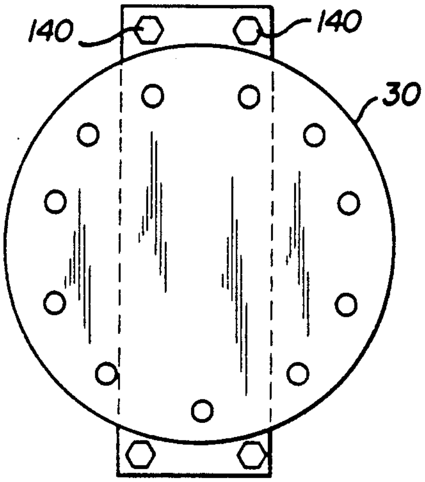
FIG. 5*b* is a schematic diagram showing the front view of FIG. 5*a*.
Figure 6B:
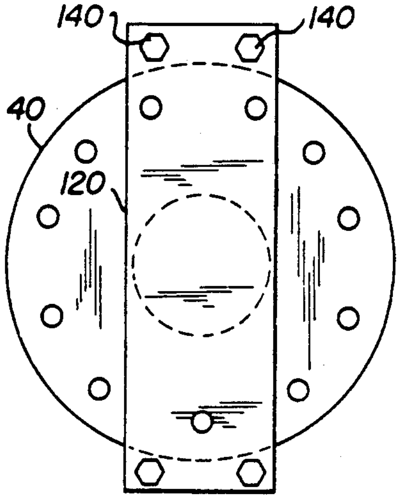
FIG. 6*b* is a schematic diagram showing the front view of FIG. 6*a*.
Figure 23:
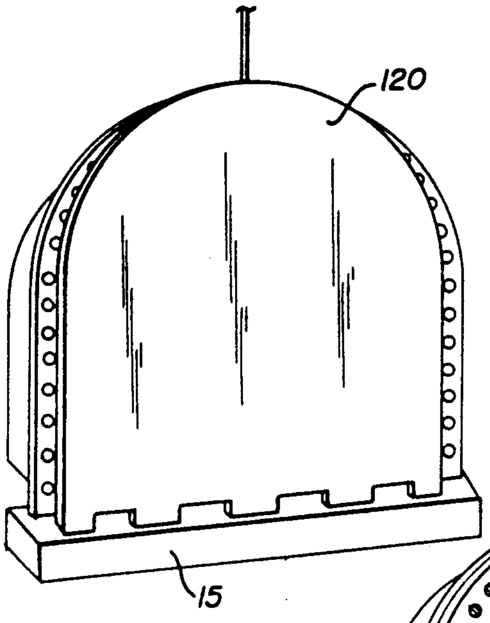
FIG. 23 shows the next step in the sequence showing the cover plate from FIG. 20 now removed after the blanking plate has been secured to the manway flange.

All of the bolts and air and/or hydraulic cylinders are now removed from the cover plate/manway flange assembly as shown in FIGS. 5a and 5b. The cover plate is now removed leaving only the blanking plate sealing the entranceway to the interior of the tank as shown in FIG. 23 and FIGS. 6a and 6b. For obvious reasons, the tank should preferably not be left in this position, with only the blanking plate sealing the manway, for any extended length of time.

The adapter 160 should now be placed in position such that adapter flange 165 is juxtaposed next to manway flange 40 shown in FIGS. 7a and 7b and should also be supported by support members similar to support members 20 discussed earlier.

Desirably, the next step in the accessing operation is to replace those bolts which were removed just prior to the removal of the cover plate. Thus, the bolts at positions 11–14, 16, 18, 21, 22, 24, 25, 28, 30 and 32–35 from the manway shown in FIG. 1A would now be replaced. Again, it is not critical that these precise bolts be replaced at this time. What is important is that bolts are replaced to at least partially secure the adapter to the manway flange while at the same time not interfering with the subsequent removal of the blanking plate.

It is noted that the bolt holes at positions 10, 15, 19, 27, 31 and 36 are still open and free to once again receive air and/or hydraulic cylinders 75.

The replaced bolts should now be loosely tightened in preparation for the withdrawal of the blanking plate. Air and/or hydraulic cylinders 75 should also be replaced in the same manner as described earlier. Adapter flange 165 will, of course, have air and/or hydraulic cylinder bolt holes 60 drilled therein to accommodate the mounting of the air and/or hydraulic cylinders. The position at this point in the operation is shown in FIGS. 8a and 8b (air and/or hydraulic cylinders now shown).

Figure 24:
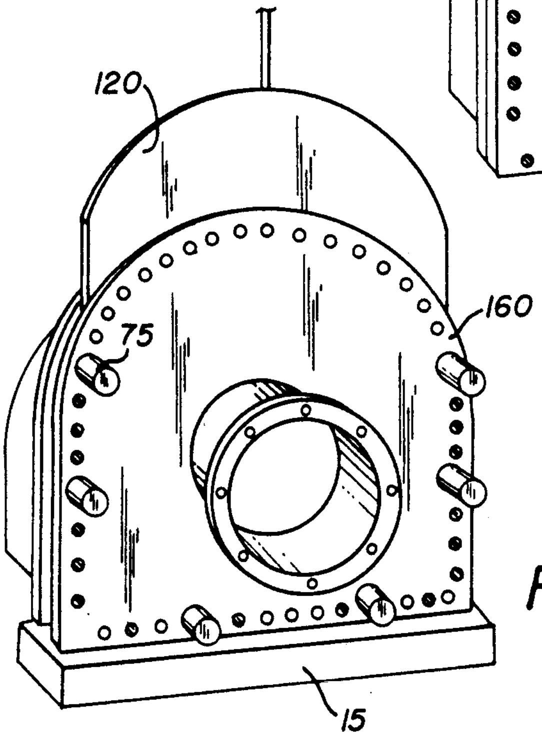
FIG. 24 employs the structure of FIG. 23 and shows the next steps in the accessing sequence in which the adapter has been positioned and secured to the manway flange by a number of bolts; the air cylinders have been reinstalled; and the blanking plate is in the process of being removed.

In the next phase of the operation, the air and/or hydraulic cylinders are operated to clamp the adapter flange, blanking plate and manway flange together by the introduction of air and/or hydraulic oil to the front port 110. The clamps 135 holding the blanking plate in place are then removed, as shown in FIG. 19a. The air and/or hydraulic oil pressure in the cylinders is then reversed causing air to enter at port 115 such that it spreads the adapter flange apart from the manway flange. The blanking plate is then quickly removed as shown in FIG. 24 resulting in the position shown in FIG. 10.

Figure 25:
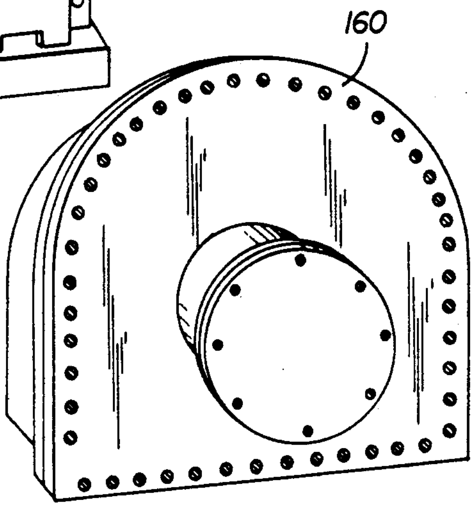
FIG. 25 illustrates the next and final position of the accessing sequence in which the blanking plate as illustrated in FIG. 24 has been completely removed and the adapter is fully secured to the manway flange.

The air and/or hydraulic cylinders are then operated to clamp the adapter flange up against the manway flange and all of the remaining bolts are returned and tightened. After removing the air and/or hydraulic cylinders and replacing the final bolts, the adapter is finally securely sealted to the manway as shown in FIG. 25 and the accessing operation is complete.

What is claimed is:

1. A method for gaining access to the interior of an enclosure, which enclosure has a passageway with one end of the passageway communicating with the interior of the enclosure and its other end communicating with the exterior of the enclosure, said other end terminating with a passageway flange surrounding at least a portion of the passageway having a cover plate secured to said flange forming a cover plate/flange assembly, which cover plate seals the passageway, characterized in the steps of:

a) separating the cover plate from the passageway flange and inserting a blanking plate between the cover plate and the passageway flange;

b) securing the blanking plate to the passageway flange;

c) removing the cover plate and permitting access to the interior of the enclosure;

d) juxtaposing an adapter member adjacent to the blanking plate, said adapter member having an adapter flange at one end thereof and at least one or more opening means to allow access to the interior of the enclosure at its other end;

e) securing the adapter member flange to the passageway flange; and f) removing the blanking plate.

2. The method of claim 1, wherein a separating means is affixed to at least the cover plate to separate the cover plate from the passageway flange to allow for the insertion of the blanking plate between the cover plate and the passageway flange.

3. The method of claim 2, wherein the separating means is an air and/or hydraulic cylinder.

4. The method of claim 1, wherein the cover plate is secured to the passageway flange by a plurality of securing means.

5. The method of claim 4, wherein the securing means is removed from one portion of the cover plate and passageway flange assembly and the blanking plate is inserted at that portion of the assembly.

6. The method of claim 5, wherein the longitudinal dimension of the blanking plate is in the direction of insertion and the latitudinal dimension of the blanking plate is less than the shortest distance between the securing means which are located on opposite sides of the inserted blanking plate which distance is measured perpendicular to the direction of insertion.

7. The method of claim 6, wherein the longitudinal dimension of the blanking plate which is in the direction of insertion is greater than the corresponding dimension of the cover plate/passageway flange assembly thereby providing a blanking plate extension at one or both ends of the blanking plate after its insertion between the cover plate and the passageway flange.

8. The method of claim 7, wherein the blanking plate is secured to the passageway flange at the extensions of the blanking plate.

9. The method of claim 1, wherein the blanking plate is secured to the passageway flange by at least one U-shaped clamping member and bolting means, the clamping member having two legs, one leg being longer than the other leg, the end of the longer leg being juxtaposed against the blanking plate and the end of the shorter leg being juxtaposed against the passageway flange, and the bolting means passing through the blanking plate and clamping member.

10. The method of claim 1, wherein the blanking plate has a surface area large enough to seal the passageway.

11. The method of claim 1, wherein the adapter member comprises a housing.

12. The method of claim 11, wherein the housing contains a submersible pump.

13. The method of claim 1, wherein the adapter flange mates with and is substantially coextensive with the passageway flange.

* * * * *